United States Patent
Shields

(10) Patent No.: US 6,334,508 B1
(45) Date of Patent: Jan. 1, 2002

(54) FOLDING HUNTER LADDER STAND

(76) Inventor: Ronald M. Shields, 4966 Co. Rd. 2242, Greenville, TX (US) 75402

( * ) Notice: Subject to any disclaimer, the term of this patent is extended or adjusted under 35 U.S.C. 154(b) by 0 days.

(21) Appl. No.: 09/504,545

(22) Filed: Feb. 15, 2000

(51) Int. Cl.[7] .............................. E06C 7/16; E04G 3/00
(52) U.S. Cl. ..................... 182/116; 182/135; 182/187
(58) Field of Search ................................ 182/116, 115, 182/124, 20, 187, 163, 22; 16/324–333, 254, 382

(56) References Cited

U.S. PATENT DOCUMENTS

| | | | |
|---|---|---|---|
| 3,057,431 A | | 10/1962 | George ...................... 182/163 |
| 4,102,433 A | * | 7/1978 | Van Valkenburgh .... 182/163 X |
| 4,719,990 A | * | 1/1988 | Markovic ................... 182/163 |
| 4,742,888 A | * | 5/1988 | Amacker .................... 182/116 |
| 5,064,020 A | * | 11/1991 | Eagleson ..................... 182/20 |
| 5,242,030 A | * | 9/1993 | Lobozzo ..................... 182/187 |
| 5,253,732 A | | 10/1993 | Daniels ...................... 182/116 |
| 5,267,632 A | * | 12/1993 | Mintz ......................... 182/116 |
| D344,346 S | | 2/1994 | Lobozzo |
| 5,368,127 A | | 11/1994 | Phillips ...................... 182/187 |
| 5,435,412 A | * | 7/1995 | Franklin, III et al. ... 182/187 X |
| 5,538,101 A | * | 7/1996 | Kempf ........................ 182/116 |
| 5,566,780 A | * | 10/1996 | Bambrough ................ 182/116 |
| 5,655,623 A | * | 8/1997 | Skyba ......................... 182/116 |
| 5,839,538 A | * | 11/1998 | Magyar ....................... 182/20 |

FOREIGN PATENT DOCUMENTS

WO  WO 93/13697  7/1993

\* cited by examiner

*Primary Examiner*—Daniel P. Stodola
*Assistant Examiner*—Hugh B. Thompson

(57) ABSTRACT

A hunting stand rotatably connected to a first ladder section and a second ladder section rotatably connected to the first ladder section which can be locked in a deployed configuration and fastened to a tree by a ratchet strap that encircles the tree and connects to the stand. The weight of the hunter is supported by a steel brace connecting the deployed stand to the first ladder section and also by the tree.

7 Claims, 3 Drawing Sheets

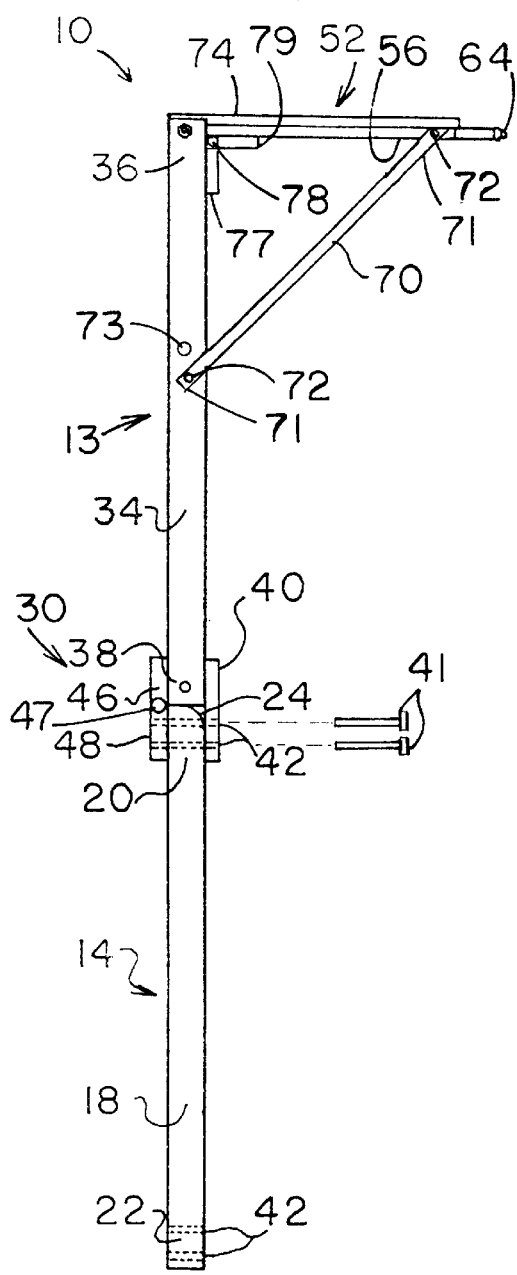
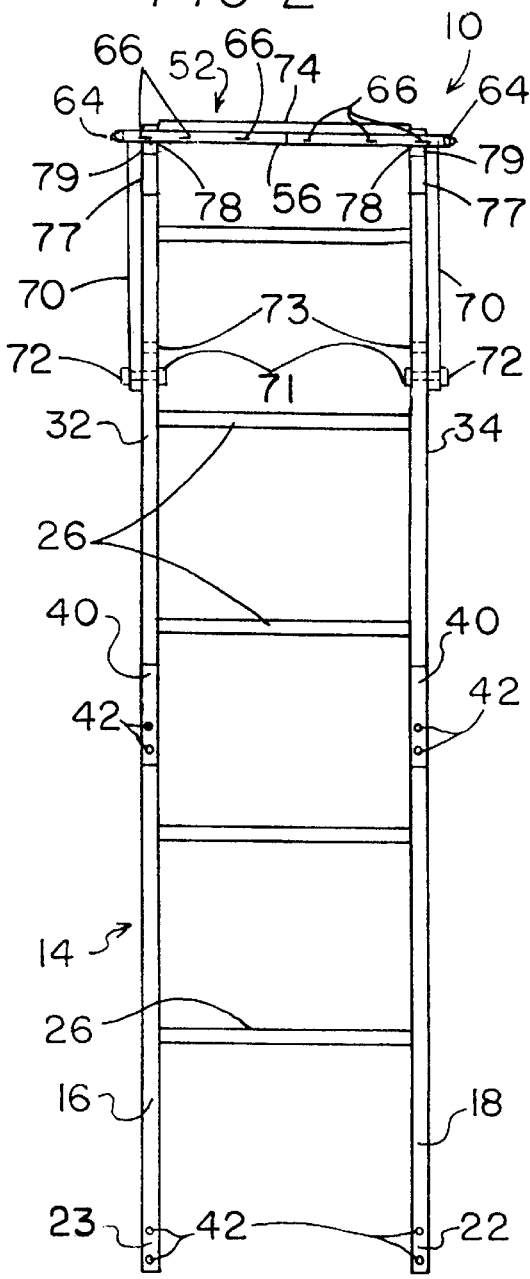

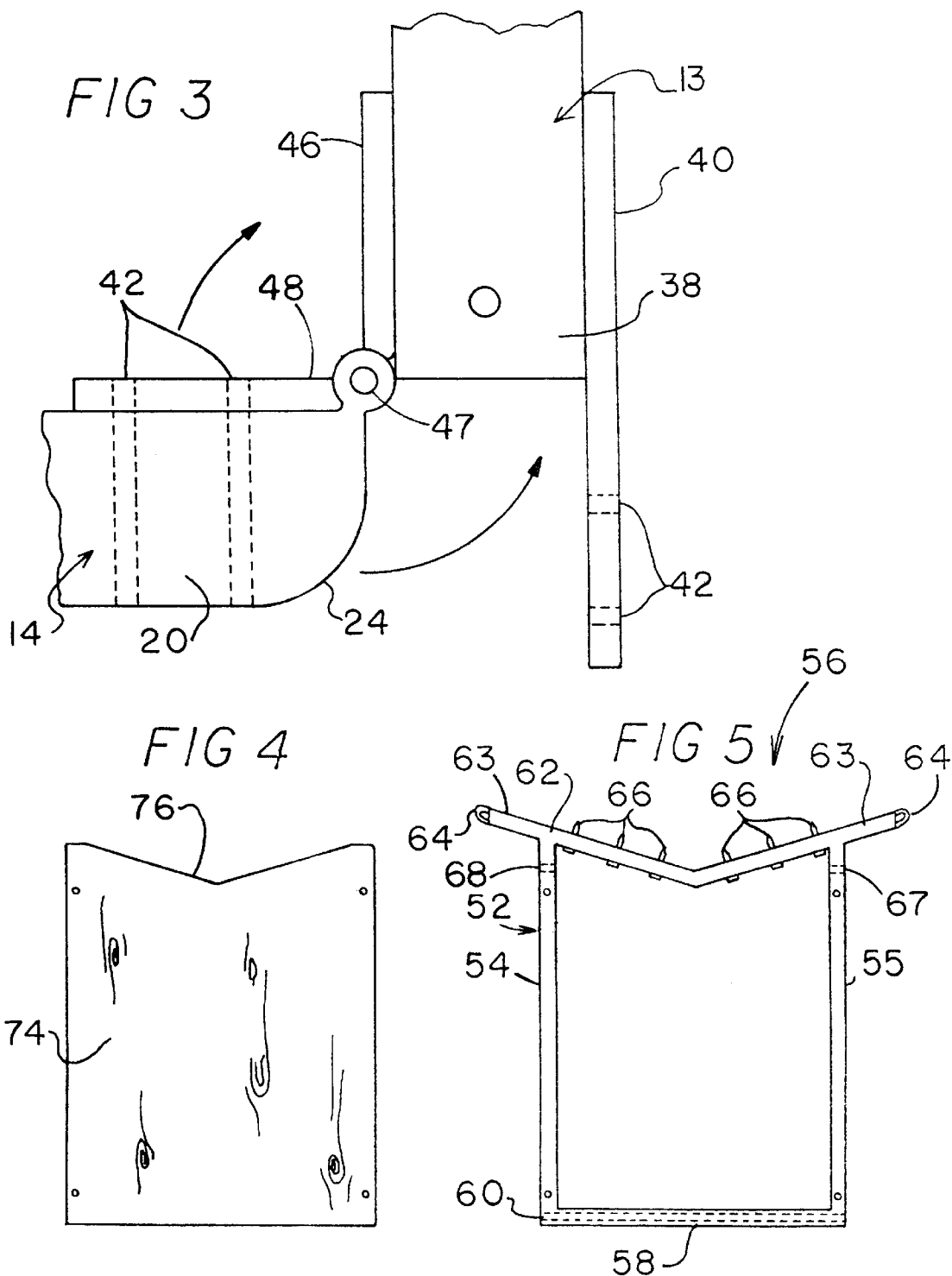

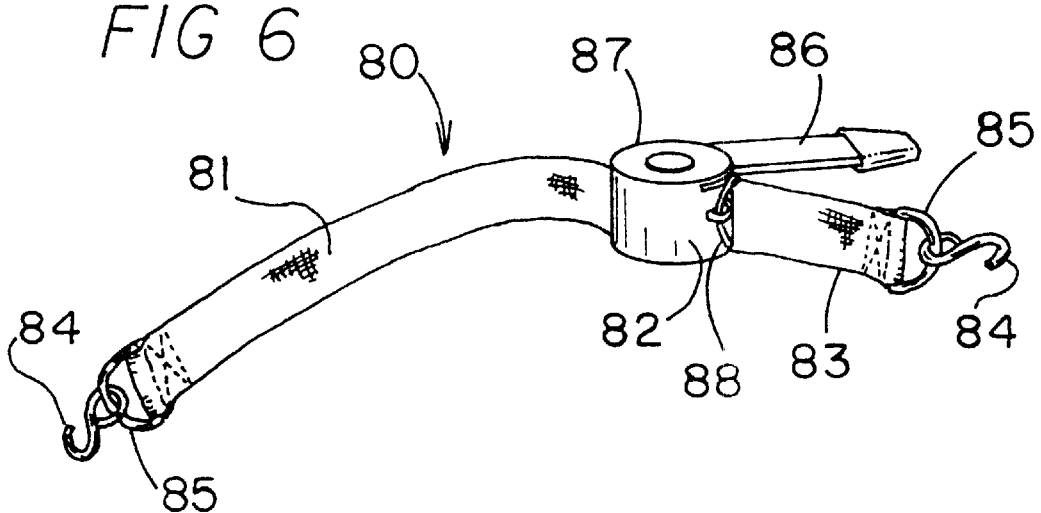
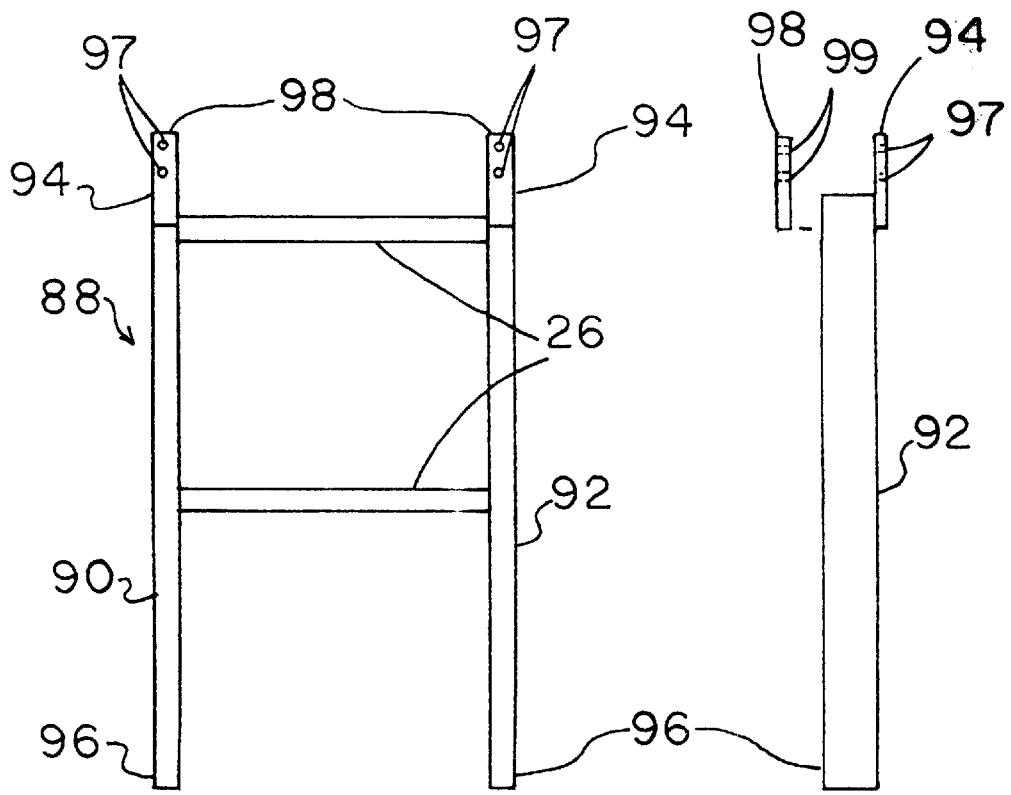

FOLDING HUNTER LADDER STAND

BACKGROUND OF THE INVENTION

1. Field of the Invention

The present invention relates to an apparatus for providing a portable elevated stand for removable attachment to a tree.

2. Description of the Prior Art

Hunters use elevated stands as one method of spotting and shooting game. Bowhunters in particular use elevated stands for a significant portion of their hunting regimen. Heights of ten feet above the ground or more are desirable. The requirements for such a stand is that it can be folded for storage in an automotive vehicle for transportation to the hunting area and further, that it can be carried by one man to an off road hunting sight. The stand should provide easy assembly, a safe means of ascent, and a secure and stable platform for the hunter once deployed and assembled. Weight is saved by using a stand that attaches to a tree. A further advantage of a stand that attaches to a tree is that it can blend into the terrain. U.S. Pat. No. 5,368,127 discloses a platform, a plurality of ladder sections, a mating section for joining the ladder section to the platform, a "V" shaped spiked bar with teeth for engaging a tree, and a roping dowel and fasteners for securing the device to the tree. U.S. Pat. No. 3,057,431 discloses a folding ladder and stand that is strapped to a tree. U.S. Pat. No. 5,253,732 discloses a yoke and strap for securing a stand to a tree. U.S. Pat. No. 4,742,808 discloses a stand off member to increase support. U.S. Pat. No. Design 344,346 discloses a tree stand design. What is needed beyond the prior art is a stand of simpler design and greater ease of operation than the designs disclosed in the prior art so that a strong and durable stand can be carried by one person in addition to his or her other equipment. A further need beyond the prior art is for a stand design that will have minimum impact on the tree to which the stand is attached.

SUMMARY OF THE INVENTION

The present invention meets the needs and solves the problems identified above by providing an apparatus comprising a hunting stand rotatably connected to a first ladder section and a second ladder section rotatably connected to the first ladder section which can be locked in a deployed configuration and fastened to a tree by a ratchet strap that encircles the tree and connects to the stand. The weight of the hunter is supported by a steel brace connecting the deployed stand to the first ladder section and also by the tree. The tree stand unit folds up to fit in the back of a short bed pickup truck and extends to ten feet when deployed. Extension packages can be added to reach heights of 12 feet, 14 feet or 16 feet. The platform measures approximately 2 feet by 2 feet. A "V" shaped indentation in the rear of the platform rests against the tree. The platform is attached to the ladder leg support with a hinged joint allowing it to fold against the legs for compact transport. A brace extends from the outer edge of the platform, down at an angle to the point of attachment to the ladder support below the platform hinge. The platform is secured to the tree with a ratchet strap that encircles the tree and is tightened around the tree trunk.

The ladder support is made in two sections that are hinged together for folding. The hinged joint is arranged so that when the ladder stand is resting against the tree, the joint locks in the straight or extended position. It folds only in the opposite direction. The apparatus includes extension legs comprising a 2 foot section and a 4 foot section which may be bolted to the bottom of the ladder support section of the apparatus separately or the extension legs may be bolted together and affixed to the ladder support section of the apparatus. When deployed the ladder is locked in position by passing bolts through bolt holes in 1 inch wide angle iron sections mounted on the front and rear of the ladder joint sections. The angle iron sections are 9 inches long. The platform frame has ¼ inch screws protruding ½ inch out to "bite" the tree.

The foregoing and other objects, features and advantages of the invention will be apparent from the following more particular description of a preferred embodiment of the invention, as illustrated in the accompanying drawings wherein like reference numbers represent like parts of the invention.

BRIEF DESCRIPTION OF THE DRAWINGS

FIG. 1 is a side view of the apparatus.

FIG. 2 is a front view of the apparatus.

FIG. 3 is a detail side view of a ladder hinge section.

FIG. 4 is a top view of the stand floor.

FIG. 5 is a top view of the stand frame.

FIG. 6 is a perspective view of the ratchet belt.

FIG. 7 is a front view of an extension section.

FIG. 8 is a side view of the extension section of FIG. 7.

DESCRIPTION OF PREFERRED EMBODIMENTS

In FIG. 1, hunting stand 10 is shown with platform element 52 and ladder element 30. Platform element 52 has platform 74, platform frame 56, buckle 64, and platform brace 70. Ladder element 30 has first ladder 13 and second ladder 14. First ladder 13 has platform hinge 78 which rotatably connects first ladder 13 to platform frame 56. Platform hinge 78 is affixed to first ladder 13 by platform hinge first plate 77. In the preferred embodiment, platform hinge first plate 77 is made of 1 inch wide steel and is affixed to first ladder 13 by welding. Platform hinge 78 is affixed to platform frame 56 by platform hinge second plate 79. In the preferred embodiment, platform hinge second plate 79 is made of 1 inch wide steel and is affixed to platform frame 56 by welding. Platform hinge first plate 77 and platform hinge second plate 79 are hingedly connected by platform hinge 78.

First ladder 13 and second ladder 14 are rotatably affixed by ladder hinge 47. First ladder 13 has first hinge brace 46 and second hinge brace 48 which are fixedly connected to first ladder right support 34 and to second ladder right support 18. In the preferred embodiment, first hinge brace 46 and second hinge brace 48 are made of 1 inch wide steel and are affixed to first ladder right support 34 and to second ladder right support 18 by welding. First hinge brace 46 and second hinge brace 48 are rotatably connected by ladder hinge 47. First ladder 13 has first ladder first end 36 and first ladder second end 38. First ladder 13 has rear brace 40 which is fixedly engaged to first ladder 13. Second hinge brace 48 has bolt holes 42. Second ladder 14 has second ladder first end 20 and second ladder second end 22. Second ladder first end 20 has bolt holes 42 and second ladder second end has bolt holes 42. Rear brace 40 has bolt holes 42. Second hinge brace 48, second ladder 14 and rear brace 40 have bolt holes 42 which align to make one continuous set of holes through deployed first ladder 13 and second ladder 14 as shown in FIG. 1. Bolts 41 are placed into bolt holes 42 after the ladder is deployed to lock and secure first ladder 13 and second ladder 14 in the deployed position and to ensure that there will no rotation of first ladder 13 and second ladder 14 around ladder hinge 47. In the preferred embodiment bolt holes 42 are sized to receive ¼ inch bolts and the bolts that are used are ¼ inch bolts that are 1 and ½ inches long treaded to receive wing nuts. To fold second ladder 14 against first ladder 13, bolts 41 in bolt holes 42 in rear brace 40, second ladder 14 and second hinge brace 48 are removed and second ladder 14 is rotated clockwise and upward until second ladder 14 lies parallel to first ladder 13. Platform frame 56 has first platform frame bolt 72 in first platform frame bolt hole 71 which rotatably connects platform from 70 to platform frame 56. In the preferred embodiment first platform from bolt 72 is ¼ inch bolt that is 2 inches long and threaded for receiving regular nuts. Platform brace 70 is rotatably and removably connected to first ladder right support 34 by platform brace bolt 72 inserted in platform brace bolt hole 71. Alternatively, platform brace 70 may be secured to first ladder right support 34 by engaging platform brace bolt 72 in platform brace bolt second hole 73. By engaging platform brace 70 to first platform brace bolt second bole 73 platform 74 will lie at approximately 93 degrees to first ladder 13 or, in other words, an approximate three degree outward angle from the vertical is achieved so that ladder element 30 will have a slight slope outward away from the tree (not shown) to which hunting stand 10 is affixed. This is desirable when extensions are used to raise the platform. For example, in the preferred embodiment ladder element 30 is approximately 10 feet long and can be lengthened to 12 feet by adding a two foot extension, to 14 feet by adding a four foot extension or to 16 feet by adding both the two foot extension and the four foot extension. In the preferred embodiment, Platform brace 70 is approximately 29 inches long and is made of ¾ inch square steel tubing. Also in the preferred embodiment, platform brace first hole 71 and platform brace second hole 73 are sized to receive ¼ inch bolts that are two inches long are threaded to receive regular nuts.

In FIG. 2, hunting stand 10 is viewed from the rear (or from the perspective of the tree to which hunting stand 10 is to be affixed. First ladder 13 has first ladder right support 34 and first ladder left support 32. Rungs 26 are fixedly connected to first ladder right support 34 and first ladder left support 32. In the preferred embodiment, rungs 26 are made of 1 inch square steel tubing and are spaced approximately 15 inches apart. Also in the preferred embodiment, first ladder right support 34 and first ladder left support 32 are made of 1 inch square steel tubing. Second ladder 14 has second ladder right support 18 and second ladder left support 16. In the preferred embodiment, second ladder right support 18 and second ladder left support 16 are made of 1 inch square steel tubing. Rungs 26 are fixedly connected to second ladder right support 18 and second ladder left support 16. Rear brace 40 is seen fixedly engaged to first ladder right support 34 and rear brace 40 is seen fixedly engaged to first ladder left support 32. Bolt holes 42 in rear brace 40 are shown for receiving bolts (not shown) to secure first ladder right support 34 to second ladder right support 18 and first ladder left support 32 to second ladder left support 14. Platform 52 is shown with platform frame 56 having screws 66 protruding from frame 56. Platform frame 56 has buckles 64 at the right and left outside edges of platform frame 56. Buckles 64 are for affixing ratchet belt 80 (see FIG. 6) to platform frame 56. Braces 70 are shown affixed to first ladder right support 34 by brace bolt 72 and to first ladder left support 32 by brace bolt 72. Brace bolt 72 is placed in platform brace first hole 71. Platform brace second holes 73 are shown for affixing braces 70 to first ladder right support 34 and first ladder left support 32 when a slight angle out from the tree is desired for ladder element 30. Platform frame 56 is rotatably affixed to first ladder left support 32 and to first ladder right support 34 by platform hinge 78. First ladder 13 has platform hinge 78 which rotatably connects first ladder 13 to platform frame 56. Platform hinge 78 is affixed to first ladder 13 by platform hinge first plate 77. Platform hinge 78 is affixed to platform frame 56 by platform hinge second plate 79.

FIG. 3 depicts a detailed view of the hinge connection between first ladder 13 and second ladder 14. First ladder 13 has first hinge brace 46 which is fixedly connected to first ladder second end 38. In the preferred embodiment, first hinge 47 is affixed to ladder 13 by welding. Second ladder first end 20 is fixedly connected to second hinge brace 48. In the preferred embodiment, second hinge brace 48 is affixed to second ladder first end 20 by welding. First hinge brace 46 and second hinge brace 48 are rotatably connected by hinge 47. First ladder 13 has rear brace 40 which is fixedly engaged to first ladder 13 and which extends downward past first ladder second end 38. In the preferred embodiment, rear hinge brace 40 is made of 1 inch wide angle iron that is nine inches long and where four inches are welded to first ladder 13 and the remaining five inches extend downward past first ladder second end 38. Second hinge brace 48 has bolt holes 42. Second ladder first end 20 has bolt holes 42 and second ladder second end has bolt holes 42. Rear brace 40 has bolt holes 42. Second ladder hinge brace 48, second ladder 14 and rear brace 40 have bolt holes 42 which align to make one continuous set of holes running through the deployed first ladder 13 and second ladder 14 as shown in FIG. 1. Bolts (not shown) are placed into bolt holes 42 after the ladder is deployed to lock and secure first ladder 13 and second ladder 14 in the deployed position and to ensure that there will be no rotation of first ladder 13 and second ladder 14 around hinge 47. To fold second ladder 14 against first ladder 13, bolts (not shown) in bolt holes 42 in rear brace 40, second ladder 14 and second hinge brace 48 are removed and second ladder 14 is rotated clockwise and upward until second ladder 14 lies parallel to first ladder 13.

FIG. 4 shows platform 74. Platform 74 has a notched rear edge 76 for engaging the tree to which hunting stand 10 is to be deployed. In the preferred embodiment, platform 74 is made from plywood and is approximately two feet wide and two feet long. Platform 74 may be made from other durable material such as plastic, polyurethane or polyvinyl chloride.

FIG. 5 shows platform frame 56, notched section 63, right arm 55, left arm 54 and front arm 58. Notched section 63 has screws 66 inserted in notched section 66 and protruding toward the interior angle of notched section 63. In the preferred embodiment, screws 66 protrude approximately ½ inch from notched section 63. Right arm 55 has right arm hole 67 for receiving platform bolt 72 (see FIG. 1). Left arm 54 has left arm hole 68 for receiving platform bolt 72 (not shown). In the preferred embodiment, buckles 64 are made from chain link welded to notched section 62. Buckles 64 are for receiving ratchet belt hooks 84 (See FIG. 6).

FIG. 6 depicts ratchet belt 80 having housing 82, tightening arm 86, tightening belt 81 and anchor belt 83. Tightening belt 81 has ring 85 and hook 84 engaged to ring 84. Anchor belt 83 also has ring 85 and hook 84 affixed to one end. Anchor belt 83 has anchor ring 87 affixed to container ring 88. Ratchet belt 80 is used as a component of hunting stand 10 by affixing hooks 84 to buckles 64 of platform frame 56 after passing ratchet belt 80 around the tree to which hunting stand 10 is to be secured.

FIG. 7 shows ladder extension section 88 having ladder extension right support 92, ladder extension left support 90 and rungs 26 fixedly engaged to ladder extension right support 92 and ladder extension left support 90. Ladder extension right support rear brace 94 has ladder extension right support rear brace holes 97. Ladder extension support front brace 98 has ladder extension support front brace holes 99. Ladder extension right support 92 has ladder extension support rear brace 94 fixedly engaged to ladder extension right support 92. Ladder extension support front brace 98 is separate and is placed in position when ladder extension 88 is mated with ladder element 30 (see FIG. 1). Likewise, ladder extension left support 88 has ladder extension support rear brace 94 and ladder extension support front brace 98 for mating with second ladder right support second end 23 and second ladder left support second end 22 (See FIG. 2). In the preferred embodiment, ladder extension 88 is made in two sizes. One size for ladder extension 88 is 2 feet long and the other size for ladder extension 88 is four feet long.

FIG. 8 is a side view of ladder extension 88 with ladder extension front brace 94 fixedly engaged to ladder extension right support 92 and ladder extension rear brace 98 positioned to be affixed when ladder extension 88 is mated with ladder element 30 or another ladder element 88. Ladder extension front brace 94 has ladder extension front brace holes 97 and ladder extension rear brace 98 has ladder extension rear brace holes 99 which align with bolt holes 42 in second ladder 14 for receiving bolts to secure ladder extension 88 to second ladder 14. In the preferred embodiment, ladder extension 88 is made in two sizes. Once size for ladder extension 88 is two feet long and the other size for ladder extension 88 if four feet long.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

I claim:

1. A hunting stand comprising:
   a platform element;
   a first ladder element having a first ladder right support and a first ladder left support;
   a second ladder element having a second ladder right support and a second ladder left support;
   a right hinge, a right rear brace, a first right hinge brace fixedly connected to the first ladder right support, a second right hinge brace fixedly connected to the second ladder right support and a plurality of right bolt holes aligned in the first ladder right support, the right rear brace and the second right hinge brace for receiving a plurality of right bolts;
   a left hinge, a left rear brace, a first left hinge brace fixedly connected to the first ladder left support and a second left hinge brace fixedly connected to the second ladder left support and a plurality of left bolt holes aligned in the first ladder left support, the left rear brace and the second left binge brace for receiving a plurality of left bolts;
   a plurality of first rungs fixedly engaged to the first ladder right support and the first ladder left support;
   a plurality of second rungs fixedly engaged to the second ladder right support and the second ladder left support;
   wherein the platform element is rotatably engaged to the first ladder element and the first ladder element is rotatably engaged to the second ladder element;
   wherein, when the plurality of right bolts are inserted in the plurality of right bolt holes, the first ladder element cannot rotate with respect to the second ladder element;
   wherein the platform element may be engaged in a first position and a second position; and,
   wherein the second position places the platform element at as approximate 93 degree angle to the first ladder element.

2. The hunting stand of claim 1 wherein the platform element further comprises:
   a platform frame having a notched section, a right arm, a left arm and a front arm;
   a platform;
   a plurality of screws projection outwardly for approximately ½ inch from the notched section and projecting toward an interior angle of the notched section;
   a left buckle affixed to a left outside edge of said left arm;
   a right buckle affixed to a right outside edge of said right arm;
   a ratchet belt having a plurality of hooks for affixing the ratchet belt to the left buckle and to the right buckle; and
   wherein the plurality of hooks are affixed to the left buckle and to the right buckle after passing the ratchet belt around a tree to which the hunting stand is to be affixed.

3. The hunting stand of claim 1 wherein said first ladder element further comprises:
   a first ladder right support having a hinge, a rear brace, a first hinge brace fixedly connected to said first ladder right support and a second hinge brace fixedly connected to a second ladder right support;
   a first ladder left support having a hinge, a rear brace, a first hinge brace fixedly connected to said first ladder left support and a second hinge brace fixedly connected to a second ladder left support;
   a plurality of rungs fixedly engaged to said first ladder right support and said first ladder left support.

4. The hunting stand of claim 1 wherein said second ladder element further comprises a second ladder right support, a second ladder left support; a plurality of rungs fixedly engaged to said second ladder right support and to said second ladder left support and a plurality of holes for receiving securement bolts;
   wherein said holes pass through said second ladder right support and said second ladder left support in a direction approximately perpendicular to said rungs.

5. The hunting stud of claim 1 further comprising an extension ladder removably affixed to the second ladder element;
   wherein the extension ladder has a right support, a left support, a right support front brace fixedly engaged to the right support, a right support rear brace fixedly engaged to the right support, a left support front brace fixedly engaged to the left support and a left support rear brace fixedly engaged to the left support; and
   wherein the right support front brace, the left support front brace, the right support rear brace and the left support rear brace mate with the second ladder element.

6. A hunting stand comprising:
   a first ladder element having a first ladder right support and a first ladder left support;
   a second ladder element having a second ladder right support and a second ladder left support;
   a platform element comprising a platform frame having a notched section, a right arm, a left arm and a front arm, a platform and a plurality of screws projecting outwardly from said notched section a right hinge, a right rear brace, a first right hinge brace fixedly connected to the first ladder right support, a second right hinge brace fixedly connected to a second ladder right support and a plurality of right bolt holes in the first ladder right support, the right rear brace and the second right hinge brace for receiving a plurality of right bolts;

a left hinge, a left rear brace, a first left hinge brace fixedly connected to the first ladder left support, a second left hinge brace fixedly connected to a second ladder left support and a plurality of left bolt holes in the first ladder left support, the left rear brace and the second hinge brace for receiving a plurality of left bolts; and a plurality of first rungs fixedly engaged to the first ladder right support and the first ladder left support;

a plurality of second rungs fixedly engaged to the second ladder right support and to the second ladder left support;

a left buckle affixed to a left outermost edge of the left arm;

a right buckle affixed to a right outermost edge of the right arm;

a ratchet belt having a plurality of hooks for affixing the ratchet belt to the left buckle and to the right buckle; and wherein the platform element is rotatably engaged to the first ladder element and the first ladder element is rotatably engaged to the second ladder element;

wherein when the plurality of right bolts are inserted in the plurality of right bolt holes and the plurality of left bolts are inserted in the plurality of left bolt holes, the first ladder section element cannot rotate with respect to the second ladder element.

7. The hunting stand of claim 6 further comprising a first ladder extension and a second ladder extension wherein the first ladder extension and the second ladder extension each have a right support, a left support, a right support front brace fixedly engaged to the right support, a right support rear brace fixedly engaged to the right support, a left support front brace fixedly engaged to the left support and a left support rear brace fixedly engaged to the left support;

wherein the right support front brace, the left support front brace, the right support rear brace and the left support rear brace mate with the second ladder element; and wherein the first ladder extension is approximately two feet long and the second ladder extension is approximately four feet long.

* * * * *